(12) United States Patent
Wilhelm et al.

(10) Patent No.: US 6,335,380 B1
(45) Date of Patent: Jan. 1, 2002

(54) SILICO-ACRYLIC COMPOSITIONS, METHOD OF PREPARATION AND APPLICATION TO THE OBTAINING OF COATINGS RESISTANT TO ABRASION AND SCRATCHING

(75) Inventors: Didier Wilhelm, Issy-les-Moulineaux; Armand Eranian, Courbevoie; Philippe Vincent, Compiegne, all of (FR)

(73) Assignee: Clariant (France) S.A., Puteaux (FR)

( * ) Notice: Subject to any disclaimer, the term of this patent is extended or adjusted under 35 U.S.C. 154(b) by 0 days.

(21) Appl. No.: 09/431,782

(22) Filed: Nov. 2, 1999

(30) Foreign Application Priority Data

Dec. 7, 1998 (FR) ............................. 98 15413

(51) Int. Cl.⁷ ..................... C08K 3/36; C08L 83/00; C08F 2/46
(52) U.S. Cl. .................. 522/83; 522/172; 522/182; 522/84; 522/79; 524/847; 524/858; 524/569; 524/806; 524/837
(58) Field of Search ................. 522/79, 83, 172, 522/84, 182; 524/806, 837, 847, 869, 858

(56) References Cited

U.S. PATENT DOCUMENTS

| | | | |
|---|---|---|---|
| 4,486,504 A | * | 12/1984 | Chung |
| 5,232,964 A | | 8/1993 | Evans et al. |
| 5,242,719 A | * | 9/1993 | Medford |
| 5,374,483 A | * | 12/1994 | Wright |
| 5,712,325 A | * | 1/1998 | Lewis et al. |

FOREIGN PATENT DOCUMENTS

| | | |
|---|---|---|
| EP | 0317858 | 5/1989 |
| EP | 0696621 | 2/1996 |
| FR | 2684367 | 6/1993 |

* cited by examiner

*Primary Examiner*—Susan W. Berman
(74) *Attorney, Agent, or Firm*—Browdy and Neimark

(57) ABSTRACT

Fluid silico-acrylic compositions, which can be polymerised by heat and radiation, by radical-type mechanism, with very low water (less than 1%) and volatile solvent content, containing silica, a silane and a multifunctional acrylic monomer, in which the silica is in the form of individualised particles, with a mean diameter of between 40 and 100 nm, not linked to each other by siloxane bonds, and the silane is a vinylsilane of formula (I)

$$H_2C=CH-Si(OR)_3 \qquad (I)$$

in which R represents a methyl or ethyl radical and the multifunctional acrylic monomer is 1,6-hexanediol diacrylate, and which are transparent, colourless and stable over time.

20 Claims, No Drawings

SILICO-ACRYLIC COMPOSITIONS, METHOD OF PREPARATION AND APPLICATION TO THE OBTAINING OF COATINGS RESISTANT TO ABRASION AND SCRATCHING

The present invention concerns fluid silico-acrylic compositions which are transparent, colourless and stable over time, and can be polymerised by heat or radiation, by a radical-type mechanism, with a very low water and volatile solvent content, the method of preparing them and their application to the obtaining of coatings resistant to abrasion and scratching.

Synthetic organic polymers and more particularly organic polymers transparent to sunlight, such as certain (meth)acrylic or terephthalic resins, are limited in their development by their low resistance to abrasion and their tendency to scratch. In order to obviate these drawbacks, it is often proposed to protect them with an anti-scratch and anti-abrasion coating which can be obtained by photopolymerisation of a film of a composition, aqueous or nonaqueous, containing particles of silica, one or more polymerisable acrylic monomers, in the presence of a photoinitiator and possibly one or more silanes. Amongst the latter compositions it is possible to cite amongst others those described in the patents U.S. Pat. Nos. 4,348,462, 4,455,205, 4,478,876, 4,486,504, 4,491,508, 4,822,828, 5,260,350 and 5,374,483.

EP-A-317.858 describes the preparation of compositions in a solvent medium containing a partial condensate of colloidal silica with a silane, at least 60% of which is of the vinylsilane type, a monomer of the multifunctional (meth) acrylate type, preferably soluble in water, and a lower alcanol, preferably isopropanol. It is this mixture in a solvent medium which is applied to synthetic films in order to obtain abrasion-resistant coatings. These compositions contain relatively high quantities of solvent, which it is necessary to evaporate during use.

U.S. Pat. No. 5,232,964 describes the preparation of a composition which forms a transparent coating which can be coloured and is resistant to abrasion after curing under radiation, comprising at least one multifunctional acrylate monomer, a silane, colloidal silica dispersed in a solvent plus a quaternary ammonium salt which gives the ability to be coloured.

JP-05-179.157 and JP-05-320.289 describe the preparation of abrasion-resistant compositions including colloidal silica, vinyltrimethoxysilane, and a mixture 1,6-hexanediol diacrylate and a di- or triacrylate isocyanurate. However, these compositions must necessarily be diluted with solvents in order to be used as a coating in a thin film.

Although the compositions described in these documents make it possible to obtain coatings having good performance both with regard to protection against abrasion and scratching and with regard to adhesion, at the present time compositions are also being sought which have further improved qualities notably with regard to fluidity, stability over time and environmental protection (reduction in volatile organic compounds or VOCs).

However, the applicant has discovered fluid compositions which are transparent, colourless and stable over time, and can be polymerised by heat or radiation, by a radical-type mechanism, with a high silica concentration, and a very low water and volatile solvent content, giving after polymerisation a coating which is hard and adherent and has good resistance to abrasion and scratching, meeting the above criteria.

The present invention concerns more precisely fluid silico-acrylic compositions, which can be polymerised by heat and radiation, by a radical-type mechanism, with very low water and volatile solvent content, containing silica, a silane and a multifunctional acrylic monomer, characterised by the fact that the silica is in the form of individualised particles, with a mean diameter of between 40 and 100 nm, not linked to each other by siloxane bonds, by the fact that the silane is a vinylsilane of formula (I)

$$H_2C=CH-Si(OR)_3 \qquad (I)$$

in which R represents a methyl or ethyl radical, and in that the multifunctional acrylic monomer is 1,6-hexanediol diacrylate, designated by the abbreviation HDDA, and by the fact that they are transparent, colourless and stable over time.

In the system of the present invention, the term polymerisable under radiation indicates that the coating can be cured under ultraviolet radiation in the presence of a photoinitiator or under electron beams without requiring a photoinitiator, and the term polymerisable by heat indicates that the coating can be cured by heat treatment in the presence of a radical catalyst.

The object of the invention is more particularly compositions as defined above, characterised in that they contain 5 to 60% by weight silica.

Amongst the latter compositions, the invention notably relates to compositions characterised in that they contain 30 to 50% by weight silica in the form of individualised particles, not linked to each other by siloxane bonds, and having a mean diameter of between 40 and 100 nm, preferentially approximately 50 nm.

Amongst the above compositions, there can be cited particularly those characterised by the fact that they contain 0.2 to 1.25 g of vinylsilane of formula (I), per gram of initial dry silica, preferentially between 0.3 and 0.65 g of vinylsilane of formula (I) per gram of initial dry silica.

The compositions according to the invention are stable over time; it is in fact found that, under optimum storage conditions, that is to say away from heat and light, at the end of several weeks to several months after the preparation of the product, there is still a clear, limpid, transparent and colourless solution. No sedimentation of the silica is noted, nor formation of gels from the silica or silanes. No appearance of haze is noted.

The compositions according to the invention are particularly fluid. Their Brookfield viscosity, after manufacture, determined at 20° C. with a Brookfield RVT apparatus at 780 rev/min is low (less than 500 mPa.s), which makes it possible to use them as they are without subsequent dilution with solvents. It is particularly favourable from the point of view of reduction in volatile organic compounds (VOCs). They are also almost free of water and volatile solvents. They contain by weight less than 1% water.

Moreover, they have a very low volatile solvent content, preferably less than 6.5% by weight, notably less than 5%, particularly less than 3%, more particularly less than 2%.

The compositions according to the invention are miscible with organic solvents themselves miscible with HDDA. They can obviously be diluted with HDDA, so as to reduce, if desired, their silica concentration.

According to the invention, the compositions as defined above can be prepared by means of a method characterised in that there are mixed, at room temperature, under stirring, an aqueous sol of acid silica containing the required quantity and grade of silica, the chosen quantity of vinylsilane of formula (I), the required quantity of HDDA and isopropyl alcohol, referred to as IPA, so that the quantity of vinylsilane of formula (I) is between 0.2 g and 1.25 g per gram of initial dry silica, and preferably between 0.3 g and 0.65 g per gram of initial dry silica, and then this mixture is subjected to distillation under reduced pressure and under stirring, at a temperature below 50° C., until the water and volatile solvents are eliminated in order to obtain a composition according to the invention.

The particles of silica, after elimination of the water and volatile solvents, lose their hydrophilic character and are thus dispersed in the HDDA. The stability of the composition according to the invention is surprising and particularly advantageous for their use.

This is because it is highly advantageous industrially to be able to obtain solvent-free compositions which remain stable over time. This aim has been achieved by regulating the quantity of vinylsilane of formula (I) according to the quantity of silica used.

The aqueous sol of acid silica is either available commercially or prepared extemporaneously by the treatment, according to known techniques, with an ion exchange resin in acid form, of an aqueous sol of commercial silica having a pH of 8 to 10.

These aqueous silica sols are available commercially and are notably sold by the applicants under the name KLEBOSOL®.

The initial aqueous silica sols used in the invention contain up to 60% by weight silica, in the form of individualised particles, with a mean diameter of between 40 and 100 nm, not linked together by siloxane bonds and with a pH of between 1 and 3 and preferably approximately 2.

The vinylsilanes of formula (I) and HDDA are commercial products.

HDDA is notably sold by various companies: UCB/RADCURE (commercial name HDDA), CRAY VALLEY (SR 238), AKCROS (Actilane 425), HENKEL (Photomer 4017).

Vinyltrimethoxysilane and vinyltriethoxysilane are sold by SIVENTO respectively under the trade name Dynasylan VTMO and Dynasylan VTEO, and by WITCO respectively under the trade name SILQUESTA-171 and SILQUEST A-151.

The compositions according to the invention have interesting properties notably because of their high silica concentration, their fluidity and their stability over time. They can easily be deposited on different types of support, described previously, and cured by radical-type mechanisms by heat or radiation (UV or electron beam) resulting in the formation of a thin film having good adhesion to the support and good resistance to abrasion and scratching, which makes them particularly useful for the production of transparent colourless protective coatings.

This is why another object of the present invention is a method of protecting a synthetic organic polymer notably against scratching and abrasion, characterised in that a layer of an above composition is deposited on said polymer and then said composition is cured.

The compositions according to the invention have silica particles with a diameter of between 40 and 100 nm, and particularly 50 nm, and are therefore particularly advantageous for obtaining anti-scratch lacquers on transparent colourless plastic, such as optical glasses or transparent plastic materials which can be used in the building trade, or on other substrates (nontransparent plastic materials, glass, wood, metal).

The following examples illustrate the present invention. In these examples, the apportioning of water was carried out by the Karl Fischer method and the levels of silica were determined by calcination at 800° C. of a sample with a known weight.

EXAMPLE 1

The following were mixed under stirring, at room temperature:

480 g of an acid silica sol, freshly prepared, containing by weight 50% water, that is to say 240 g of water, and 50% silica, that is to say 240 g of silica, with a mean diameter of 50 nm, and having a pH of 2, 1860 g of isopropyl alcohol, 206 g of 1,6-hexanedioldiacrylate 111.5 g of vinyltrimethoxysilane, i.e. 0.46 g of vinyltrimethoxysilane per gram of initial dry silica.

The reaction mixture thus obtained is next subjected to distillation at reduced pressure of approximately 150 mbars whilst keeping the temperature of the external bath at approximately 35° C. for approximately 12 hours distillation. Then the reduced pressure is broken and the reaction medium is cooled to room temperature.

In this way a solution is obtained which is clear, limpid, transparent and stable over time, containing by weight 50.2% silica and 0.65% water and having a Brookfield viscosity of 84 mPa.s, determined at 20° C. (speed 780 rev/min).

It is found that, under suitable storage conditions, that is to say away from heat and light, at the end of six months after the preparation of the product, there is still a clear, limpid, transparent, colourless and stable solution, that is to say no phenomenon of cloudiness is found, there is still a homogenous solution, even after six months of storage under the conditions set out above. Likewise, the coatings obtained with this composition exhibit no haze.

EXAMPLE 2

The following were mixed under stirring, at room temperature:

480 g of an acid silica sol, freshly prepared, containing by weight 50% water, that is to say 240 g of water, and 50% silica, that is to say 240 g of silica, with a mean diameter of 50 nm, and having a pH of 2, 1860 g of isopropyl alcohol, 206 g of 1,6-hexanedioldiacrylate 79 g of vinyltrimethoxysilane, i.e. 0.33 g of vinyltrimethoxysilane per gram of initial dry silica.

The reaction mixture thus obtained is treated as in Example 1.

In this way a solution is obtained which is clear, limpid, transparent, colourless and stable over time, containing by weight 52.2% silica and 0.45% water and having a Brookfield viscosity of 152 mPa.s., determined at 20° C. (speed 780 rev/min).

As in Example 1, it is found that a solution is always obtained which is clear, limpid, transparent, colourless and stable over time.

EXAMPLE 3

The following were mixed under stirring, at room temperature:

240 g of an acid silica sol, freshly prepared, containing by weight 50% water, that is to say 120 g of water, and 50% silica in the form of indivdualised particles, that is to say 120 g of silica, with a mean diameter of 50 nm, not linked together by siloxane bonds and having a pH of 2, 930 g of isopropyl alcohol, 103 g of 1,6-hexanedioldiacrylate 74.3 g of vinyltrimethoxysilane, i.e. 0.62 g of vinyltrimethoxysilane per gram of initial dry silica.

The reaction mixture thus obtained is treated as in Example 1.

In this way a solution is obtained which is clear, limpid, transparent, colourless and stable over time, containing by weight 0.25% water and having a Brookfield viscosity of 65 mPa.s., determined at 20° C. (speed 780 rev/min).

As in Example 1, it is found that a solution is always obtained which is clear, limpid, transparent, colourless and stable over time.

EXAMPLE 4

Example of use of formulations according to the invention for producing coatings resistant to abrasion and scratching.

a) First of all there is prepared, by mixing at room temperature (20° C.), the following formulation:

80 parts by weight of silica organosol of Example 1

20 parts by weight of urethane-acrylate oligomer CN 934 (CRAY VALLEY)

2 parts by weight of DAROCURE 1173 photoinitiator or 2-hydroxy-2-methyl-1-phenyl-propan-one (Ciba Spécialités Chimiques)

2 parts by weight of IRGACURE 500 photoinitiator or a mixture of 1-hydroxy cyclohexyl phenylketone and benzophenone=1/1 mixture by weight (Ciba Spécialités Chimiques).

b) The mixture thus obtained is deposited on a glass support to the extent of approximately 50 g/m². The glass support thus coated is placed on a conveyer moving at a speed of 25 metres per minute under a tunnel equipped with a 120 W/cm medium-pressure mercury vapour tube (FUSION-SYSTEM) emitting ultraviolet radiation, which cures the coating.

c) The abrasion resistance of the coating thus hardened was assessed by the Taber abrasion test with two CS 17-abrasive wheels and a weight of 1000 g applied to each of them, followed by a measurement of haze (diffusion of light).

The difference in haze before and after abrasion is around 1% whereas it reaches 25 to 30% for the test sample not containing any silica organosol. A very appreciable improvement in abrasion resistance is therefore found.

d) With the steel shavings qualitative test, a very good improvement in the resistance to scratching of the coating containing the organosol of Example 1 is observed, compared with the coating without organosol.

What is claimed is:

1. Fluid silico-acrylic composition, which can be polymerised by heat and radiation, by a radical-type mechanism, with very low water (less than 1%) and volatile solvent content, containing silica, a silane and a multifunctional acrylic monomer, characterised by the fact that the silica is in the form of individualised particles, with a mean diameter of between 40 and 100 nm, not linked to each other by siloxane bonds, by the fact that the silane is a vinylsilane of formula (I)

$$H_2C=CH-Si(OR)_3 \qquad (I)$$

in which R represents a methyl or ethyl radical, and in that the multifunctional acrylic monomer is 1,6-hexanediol diacrylate, and by the fact that they are transparent, colourless and stable over time.

2. The composition of claim 1 containing 5–60% by weight of said silica.

3. The composition of claim 2 containing 30–50% by weight of said silica.

4. The composition of claim 3 wherein said silica comprises said individualized particles not linked to each other by siloxane bonds, and wherein said silica particles have a mean diameter of approximately 50 nm.

5. The composition of claim 4 wherein said vinylsilane of formula (I) is present in a quantity between 0.2 g and 1.25 g per gram of initial dry silica.

6. The composition of claim 5 wherein said quantity of vinylsilane is between 0.3 g and 0.65 g.

7. The composition of claim 1 wherein said silica comprises said individualized particles not linked to each other by siloxane bonds, and wherein said silica particles have a mean diameter of approximately 50 nm.

8. The composition of claim 1 wherein said vinylsilane of formula (I) is present in a quantity between 0.2 g and 1.25 g per gram of initial dry silica.

9. The composition of claim 8 wherein said quantity of vinylsilane is between 0.3 g and 0.65 g.

10. A method of preparing a composition according to claim 1, comprising mixing, at room temperature under stirring, an aqueous acid solution of said silica, said vinylsilane of formula (I), said 1,6-hexanedioldiacrylate, and isopropyl alcohol, and distilling the resultant mixture under reduced pressure and under stirring, at a temperature less than 50° C., until said water and any volatile solvents are eliminated.

11. The method of claim 10, wherein said aqueous acid solution of silica is an aqueous sol having a pH between 1 and 3.

12. In a method of providing a transparent colorless coating on a substrate to protect said substrate against abrasion comprising applying a coating composition to said substrate and polymerizing said coating composition, the improvement wherein said coating composition is the composition of claim 1 and said polymerization comprises radical polymerization by radiation or heat.

13. In a method of providing a transparent colorless coating on a substrate to protect said substrate against abrasion comprising applying a coating composition to said substrate and polymerizing said coating composition, the improvement wherein said coating composition is the composition of claim 2 and said polymerization comprises radical polymerization by radiation or heat.

14. In a method of providing a transparent colorless coating on a substrate to protect said substrate against abrasion comprising applying a coating composition to said substrate and polymerizing said coating composition, the improvement wherein said coating composition is the composition of claim 3 and said polymerization comprises radical polymerization by radiation or heat.

15. In a method of providing a transparent colorless coating on a substrate to protect said substrate against abrasion comprising applying a coating composition to said substrate and polymerizing said coating composition, the improvement wherein said coating composition is the composition of claim 4 and said polymerization comprises radical polymerization by radiation or heat.

16. In a method of providing a transparent colorless coating on a substrate to protect said substrate against abrasion comprising applying a coating composition to said substrate and polymerizing said coating composition, the improvement wherein said coating composition is the composition of claim 7 and said polymerization comprises radical polymerization by radiation or heat.

17. In a method of providing a transparent colorless coating on a substrate to protect said substrate against abrasion comprising applying a coating composition to said substrate and polymerizing said coating composition, the improvement wherein said coating composition is the composition of claim 5 and said polymerization comprises radical polymerization by radiation or heat.

18. In a method of providing a transparent colorless coating on a substrate to protect said substrate against abrasion comprising applying a coating composition to said substrate and polymerizing said coating composition, the improvement wherein said coating composition is the composition of claim 8 and said polymerization comprises radical polymerization by radiation or heat.

19. In a method of providing a transparent colorless coating on a substrate to protect said substrate against abrasion comprising applying a coating composition to said substrate and polymerizing said coating composition, the improvement wherein said coating composition is the composition of claim 9 and said polymerization comprises radical polymerization by radiation or heat.

20. In a method of providing a transparent colorless coating on a substrate to protect said substrate against abrasion comprising applying a coating composition to said substrate and polymerizing said coating composition, the improvement wherein said coating composition is the composition of claim 6 and said polymerization comprises radical polymerization by radiation or heat.

\* \* \* \* \*